UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

GREEN DYE AND PROCESS OF MAKING SAME.

SPECIFICATION forming part of Letters Patent No. 631,605, dated August 22, 1899.

Application filed April 12, 1899. Serial No. 712,762. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Green Coloring-Matters of the Anthracene Series, (for which application for patent was made in Germany, No. B 23,567, October 17, 1898, and No. B 23,574, October 18, 1898,) of which the following is a specification.

In an application for patent of even date herewith, filed April 12, 1899, Serial No. 712,763, I have described the production of halogen derivatives of alphylated amido-anthraquinones.

My present invention relates to the production of green coloring-matters of the anthracene series by treating the said halogen derivatives with primary aromatic amins.

In order to prepare my new coloring-matters, the halogen derivative is first heated to a high temperature with about ten times the quantity of the primary aromatic amin chosen—as instances I mention anilin, toluidin, naphthylamin, phenylene-diamin, benzidin. This treatment can be effected in the presence or absence of condensing agents, such as chlorid of zinc, anilin hydrochlorate, boric acid, and so on. The heating is continued until the color of the melt no longer changes. On cooling my new coloring-matter separates out, usually in the crystalline form. It is collected and dried. In this form my new coloring-matter is not generally usable directly for dyeing, being insufficiently soluble in water, so that it has to be converted by sulfonating into the form of soluble sulfoacid.

The following examples will serve to illustrate the manner in which my invention can be carried into effect and my new coloring-matter obtained.

*Example 1: Production of new green coloring-matter from bromin derivative of the alphylated amido-anthraquinone from 1.5-dinitro-anthraquinone and anilin.*—Mix about ten (10) parts of the said halogen derivative, which may have been obtained, for instance, as described in Example 2 of the aforesaid application for Letters Patent of even date herewith, with about one hundred (100) parts of anilin. Stir the mixture and heat it while stirring until it boils. The melt is at first of a red color, but changes slowly to violet, blue, and finally to green. After boiling for about four (4) hours, when no further change in the color of the melt can be noticed, allow the melt to cool. The coloring-matter separates out in finely-crystalline form. In this form the coloring-matter is a blue powder. In order to render it capable of use for dyeing, it is converted into the form of its soluble sulfoacid.

In the above example ten (10) parts of anilin salt might be added to act as condensing agent. The reaction then proceeds more quickly without altering the nature of the product obtained.

In Example 1 the anilin can be replaced by para-toluidin and a similar product obtained. In working up this product the melt, after it is cooled, may be warmed up once more, in order that the para-toluidin may melt, so that the coloring-matter can be separated from it by filtering. If desired, the coloring-matters can be precipitated from their melts by treating with acids, but the products obtained thus are somewhat less pure.

*Example 2: Production of a new coloring-matter from the bromin derivative of the alphyl-amido-anthraquinone obtained from 1.5-dinitro-anthraquinone and para-toluidin by condensation with para-toluidin in the presence of a diluent.*—Mix together about ten (10) parts of the said halogen derivative and about thirty (30) parts of para-toluidin and add the mixture to about two hundred (200) parts of melted naphthalene. Raise the temperature of the mixture until it boils. The formation of coloring-matter begins, as can be seen from the change in color of the melt from red to blue and finally to green. Allow the melt to cool and extract with alcohol. In this way the coloring-matter is separated from any excess of para-toluidin and from the naphthalene. The coloring-matter thus obtained is in the insoluble form and must be sulfonated to convert it into the form readily applicable for dyeing.

*Example 3: Production of new coloring-matter from alphylated amido-anthraquinone*

*obtained from 1.5-dinitro-anthraquinone and benzidin by condensation with anilin.*—Mix together about ten (10) parts of the said halogen derivative and one hundred (100) parts of anilin. Heat the mixture until it boils and maintain at this temperature until the melt is green and shows no further change of color. Allow the melt to cool, and the coloring-matter separates out in the crystalline form. Collect in any suitable manner.

The chlorin substitution products of the alphyl-amido-anthraquinones, the production of which is also described in the specification of even date herewith, can also be used in the same way. It is only necessary that the corresponding quantity of the chlor derivative be used in the above examples instead of the bromin derivative. The products obtained are for practical purposes identical.

My new coloring-matters obtained according to this invention are all in the unsulfonated form, while in the form of powder dark-green in color, they frequently show crystalline structure. They are with difficulty soluble or not at all soluble in water and in alcohol, more easily soluble in benzene, nitro-benzene, and anilin, giving blue-green to blue solutions. On treating them with the usual sulfonating agents, such as concentrated sulfuric acid, fuming sulfuric acid, chlorhydrin-sulfuric acid, mixtures of sulfuric acid and boracic acid or meta-phosphoric acid, with or without the addition of kieselguhr, &c., they are readily converted into sulfoacids. These are readily soluble in hot water, giving a green solution, which is hardly changed in color by the addition of alkali. They dye unmordanted wool and wool mordanted with chrome, yielding green shades, which possess an excellent degree of fastness to light.

I add further examples for the conversion of my new coloring-matters into their soluble form of sulfoacids:

*Example 4: Sulfonation of the product of Example 1.*—Mix about ten (10) parts of the product obtained according to Example 1 in the form of the dry powder with one hundred (100) parts of monohydrate sulfuric acid. Stir the mixture from time to time and maintain the temperature at about 40° centigrade. Continue this treatment till a test portion is fully soluble in water. Pour the melt into water and precipitate the coloring-matter with common salt or chlorid of potash. My new coloring-matter in the form thus obtained is readily soluble in hot water, giving a green solution, which is hardly changed by the addition of alkali.

*Example 5: Sulfonation of the product obtained when using para-toluidin in Example 1, and a mixture of fuming sulfuric acid and boracic acid.*—Mix together about ten (10) parts of the said insoluble coloring-matter obtained according to Example 1 with about ten (10) parts of boracic acid and one hundred (100) parts of fuming sulfuric acid containing about five per cent. free anhydride ($SO_3$.) Heat the mixture to a temperature of about 100° centigrade, until the coloring-matter is soluble in water. Work up the coloring-matter in the manner described in Example 4.

Now what I claim is—

1. The process for the production of green coloring-matters of the anthracene series by heating the herein-described halogen derivatives of alphylated amido-anthraquinones with the herein-described primary aromatic amins, substantially as hereinbefore described.

2. As a new article of manufacture the green coloring-matters of the anthracene series which can be obtained from the herein-described halogen derivatives of alphylated amido-anthraquinones and a primary aromatic amin and which in the unsulfonated form are with difficulty or not at all soluble in water and in alcohol, more easily soluble in benzene, nitrobenzene and anilin and in the sulfonated form are readily soluble in hot water giving green solutions, which are hardly changed in color by the addition of alkali.

In testimony whereof I have hereunto set my hand in the presence of two subscribing witnesses.

OSCAR BALLY.

Witnesses:
ERNEST F. EHRHARDT,
J. L. HEINKE.